(12) United States Patent
Qian et al.

(10) Patent No.: US 8,742,256 B2
(45) Date of Patent: Jun. 3, 2014

(54) ELECTRONIC DEVICE ENCLOSURE

(75) Inventors: Cheng Qian, Wuhan (CN); Li-Fu Xu, Wuhan (CN); Hui Yu, Wuhan (CN); Xin-Xiang Li, Wuhan (CN); Yue-Yong Li, Wuhan (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 102 days.

(21) Appl. No.: 13/482,444

(22) Filed: May 29, 2012

(65) Prior Publication Data

US 2013/0063005 A1 Mar. 14, 2013

(30) Foreign Application Priority Data

Sep. 14, 2011 (CN) .......................... 2011 1 0271056

(51) Int. Cl.
*H05K 5/02* (2006.01)
(52) U.S. Cl.
USPC ...................... 174/50; 312/223.2; 361/679.02
(58) Field of Classification Search
USPC ........ 174/529, 536, 520, 50.51, 50.52, 50.55, 174/560, 561, 563, 53, 54, 58, 60, 67, 50; 361/607, 633, 636, 679.02, 679.32, 361/679.43, 679.58, 727, 732, 752, 801, 361/825, 832, 600; 312/257.1, 222, 293.3, 312/351.1, 265.6, 22, 223.3, 223.2, 107.5, 312/109, 111, 215, 216, 242, 333
See application file for complete search history.

(56) References Cited

U.S. PATENT DOCUMENTS

| | | | |
|---|---|---|---|
| 6,239,358 B1 * | 5/2001 | Chang ........................... | 174/362 |
| 6,250,727 B1 * | 6/2001 | Kan et al. ................... | 312/223.2 |
| 2011/0012484 A1 * | 1/2011 | Chen et al. ................. | 312/223.2 |
| 2013/0058035 A1 * | 3/2013 | Chen et al. ............... | 361/679.37 |

* cited by examiner

*Primary Examiner* — Robert J Hoffberg
*Assistant Examiner* — Michael Matey
(74) *Attorney, Agent, or Firm* — Novak Druce Connolly Bove + Quigg LLP

(57) ABSTRACT

An electronic device enclosure includes a rear panel and a blocking board. The rear panel comprises a front surface and a back surface opposite to the front surface. A through opening is defined in the rear panel. The blocking board comprises a main body, a first flange and a second flange opposite to the first flange. A first stopping piece is extends from the first flange. A second stopping piece is extended from the second flange. A latch portion is located on the first flange. A first protrusion is located on the second flange. The latch portion and the second protrusion extend through the through opening by being elastically deformed, the latch portion and the second protrusion abut on the front surface, and the first stopping piece and the second stopping piece abut on the back surface.

20 Claims, 6 Drawing Sheets

ELECTRONIC DEVICE ENCLOSURE

BACKGROUND

1. Technical Field

The present disclosure relates to electronic device enclosures, and particularly to an electronic device enclosure for a sever or a computer.

2. Description of Related Art

Electronic devices may include a rear panel and a blocking board for covering I/O devices, such as a USB interface, a keyboard interface, a microphone interface and so on. The blocking board is secured to the rear panel by a plurality of screws. However, assembly or disassembly of the blocking board may be very time-consuming and inconvenient.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
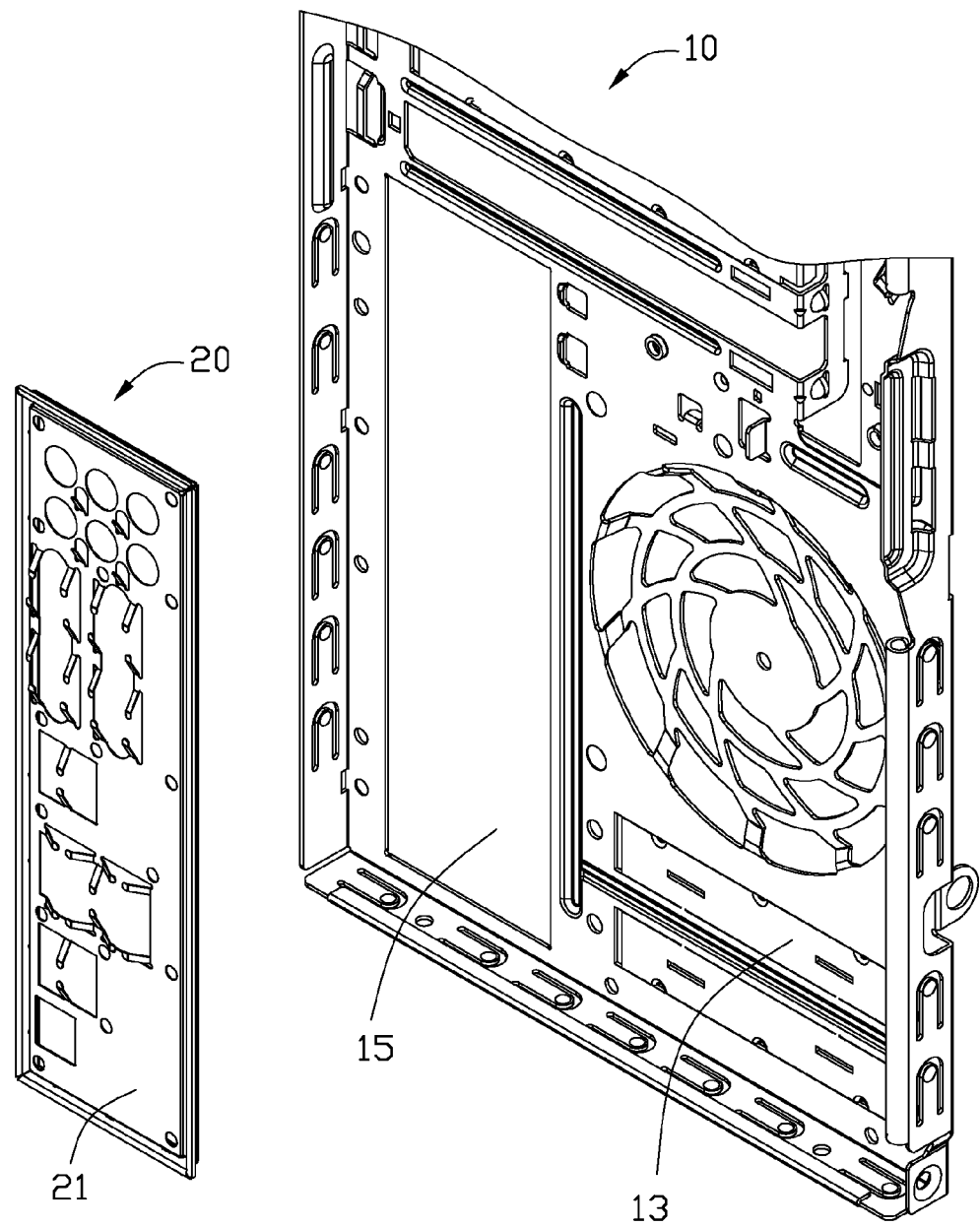
FIG. 1 is an exploded, isometric, partial view of an embodiment of an electronic device enclosure.

Referring to FIG. 1, an electronic device enclosure of one embodiment includes a rear panel 10 and a blocking board 20. In one embodiment, the electronic device may be, for example, a server or a computer.

Figure 2:
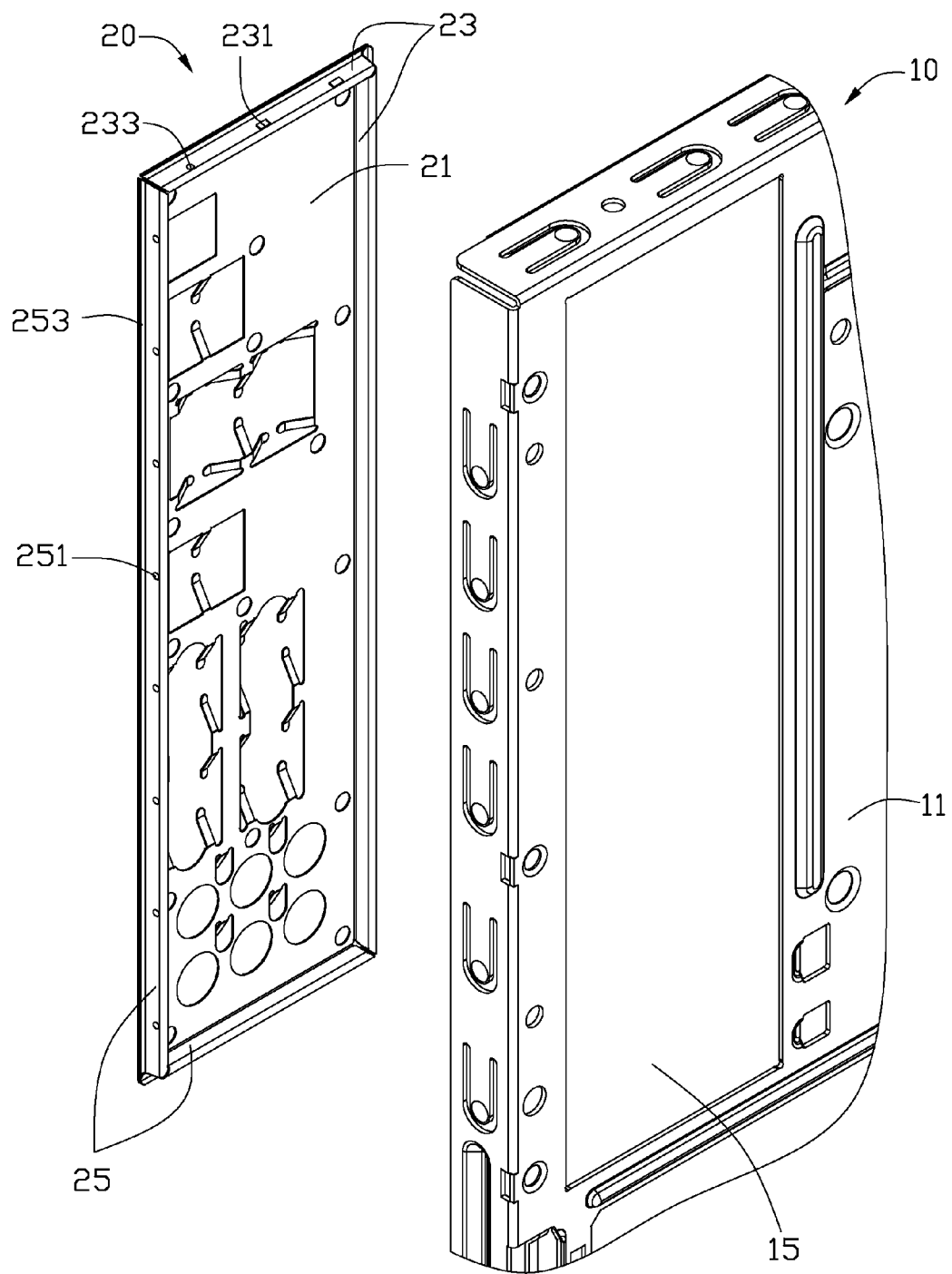
FIG. 2 is similar to FIG. 1, but viewed from different aspect.

The rear panel 10 includes a front surface 11 (shown in FIG. 2) and a back surface 13 opposite to the front surface 11. The rear panel 10 defines a through opening 15. The through opening 15 is substantially rectangular in one embodiment.

Figure 3:
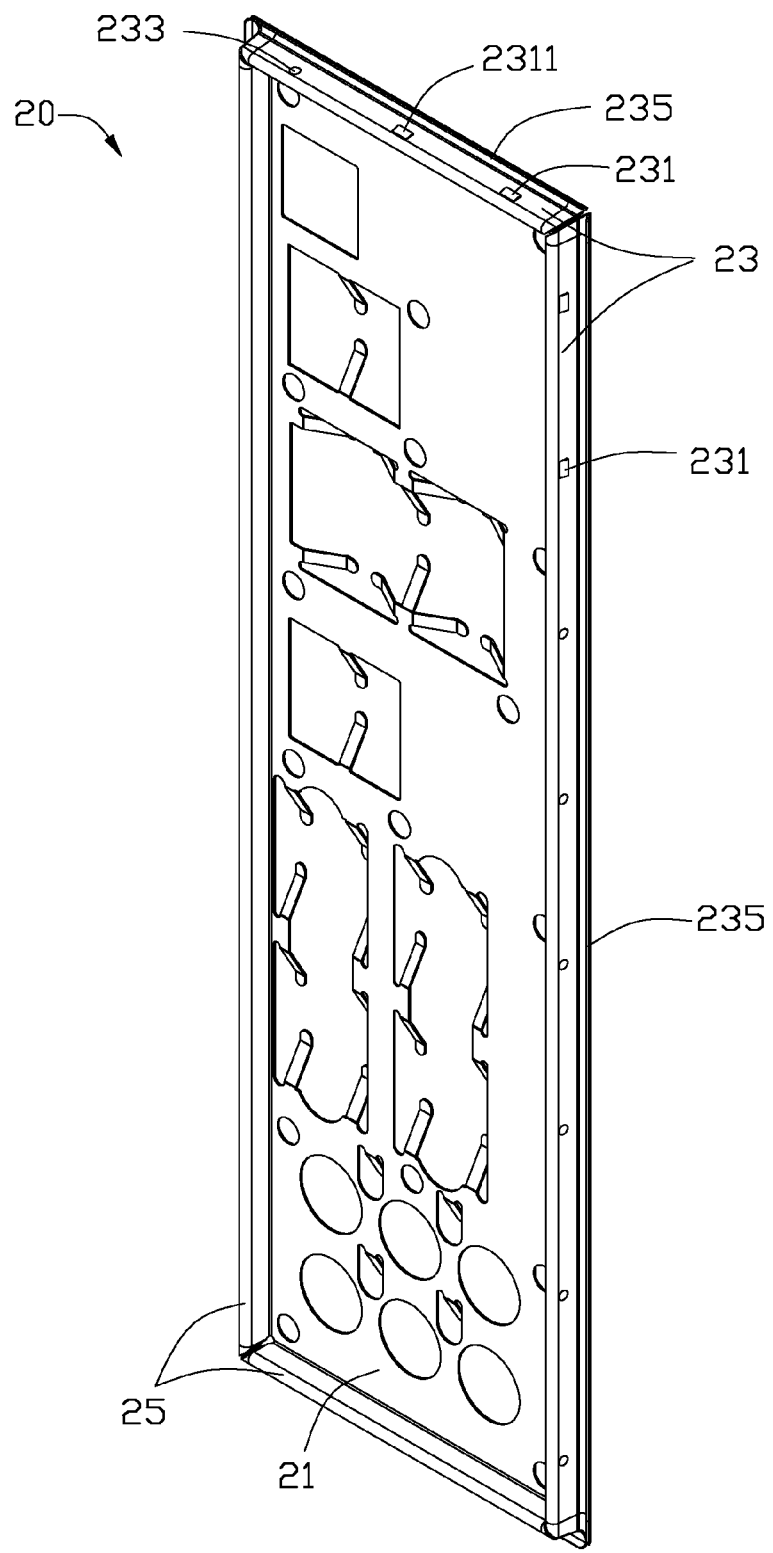
FIG. 3 is an isometric view of a blocking board of FIG. 1.

Referring to FIG. 3, the blocking board 20 includes a main body 21, two first flanges 23, and two second flanges 25 opposite to the two first flanges 23. In one embodiment, the main body 21 is substantially rectangular. The main body 21 defines a plurality of holes (not labeled) configured to receive a plurality of interface devices (not shown). In one embodiment, the interface devices may be, for example, a USB interface, a keyboard interface, and a monitor interface.

The two first flanges 23 extend from two adjacent edges of the main body 21. In one embodiment, the two first flanges 23 are perpendicular to each other and perpendicularly connected to the main body 21. A corner is defined between the two first flanges 23. The two second flanges 25 extend from the other two adjacent edges of the main body 21. In one embodiment, the two second flanges 25 are perpendicular to each other and perpendicularly connected to the main body 21. Two latch portions 231 and a plurality of second protrusions 233 are located on each of the two first flanges 23. A plurality of first protrusions 251 are located on each of the two second flanges 25. The two latch portions 231 on one of the two first flanges 23 are near to the corner, and the two latch portions 231 on another one of the two first flanges 23 are near to the corner. In one embodiment, the plurality of second protrusions 233 and the plurality of first protrusions 251 have the same configuration, each of the plurality of second protrusions 233 and the plurality of first protrusions 251 is a semicircle shaped. A first line runs through the plurality of first protrusions 251 on one of the two second flanges 25. A second line runs through the plurality of first protrusions 251 on the other of the two second flanges 25. In one embodiment, the first line and the second line are on the same plane.

Figure 6:
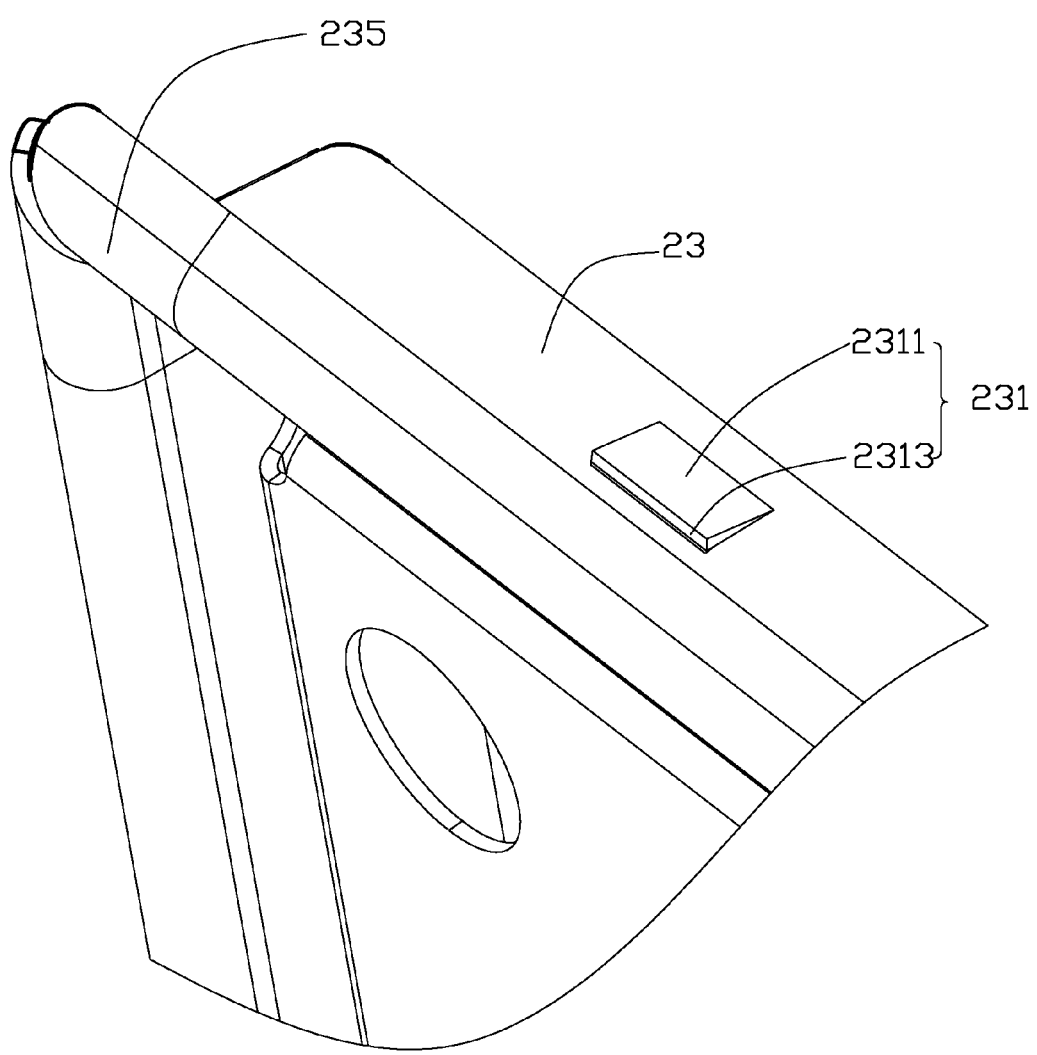
FIG. 6 is an isometric, partial view of the blocking board of FIG. 3.

Referring to FIG. 6, each of the latch portions 231 has a guiding portion 2311 and a resisting portion 2313 connected to the guiding portion 2311. A first plane contains the guiding portion 2311. In one embodiment, an acute angle is defined between the guiding portion 2311 and corresponding one of the two first flanges 23. A second plane contains the resisting portion 2313. In one embodiment, the second plane is substantially perpendicular to the corresponding one of the two first flanges 23, and a second acute angle is defined between the first plane and the second plane. A first stopping piece 235 bends from the two first flanges 23 and a second stopping piece 253 bends from the two second flanges 25.

Figure 4:
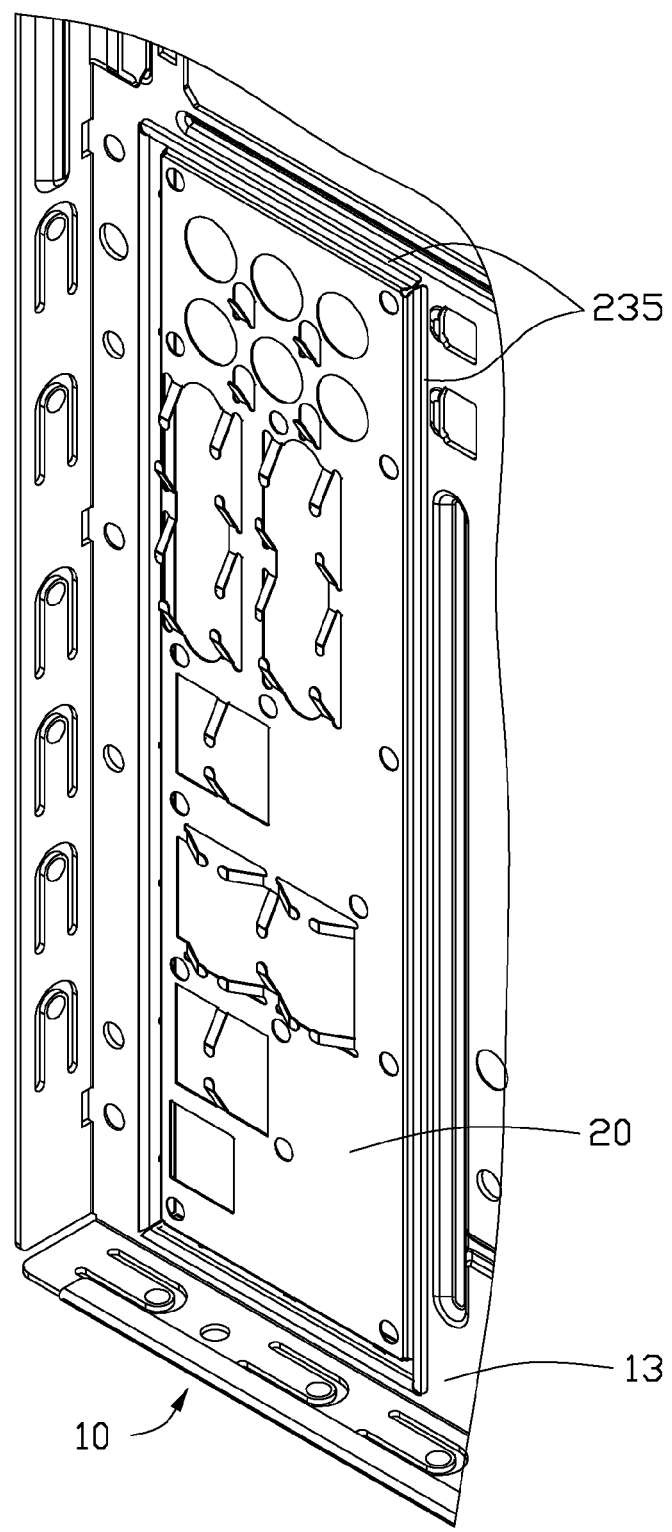
FIG. 4 is an assembled view of the electronic device enclosure of FIG. 1.
Figure 5:
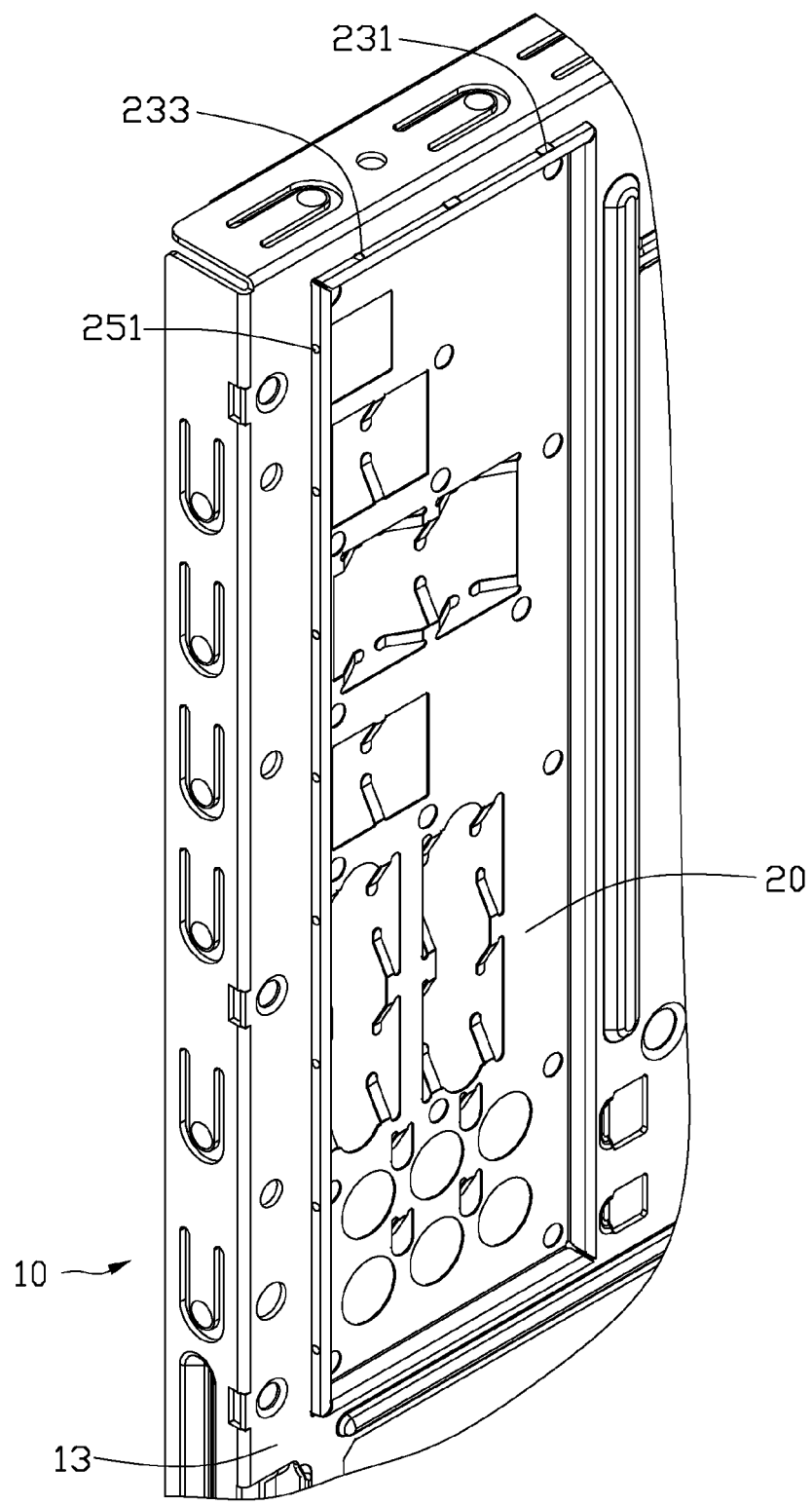
FIG. 5 is similar to FIG. 4, but viewed from different aspect.

Referring to FIGS. 4-5, in assembly, the blocking board 20 is placed on the back of the rear panel 10, the two first flanges 23 and the two second flanges 25 are inserted into the through opening 15. The plurality of second protrusions 233, the plurality of first protrusions 251 and the guiding portions 2311 abut on the back surface 13. The blocking board 20 is pushed towards a first direction perpendicular to the rear panel 10. The edges of the through opening 15 extrude to deform the plurality of second protrusions 233, the plurality of first protrusions 251 and the guiding portions 2311 to extend through the through opening 15. The plurality of second protrusions 233 and the plurality of first protrusions 251 abut on the front surface 11, and the resisting portions 2313 abut on the front surface 11. The first stopping piece 235 and the second stopping piece 253 abut on the back surface 13. The blocking board 20 is thereby installed on the rear panel 10.

In disassembly, one side of the blocking board 20 is pushed towards a second direction opposite to the first direction, and the edges of the through opening 15 extrude to deform the plurality of first protrusions 251 to extend through the through opening 15, until disengage the two second flanges 25 from the through opening 15. Thus, the blocking board 20 is easily detached from the rear panel 10.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. An enclosure comprising:

a rear panel, the rear panel comprising a front surface and a back surface opposite to the front surface, a through opening defined in the rear panel; and a blocking board, the blocking board comprising a main body, a first flange and a second flange opposite to the first flange; a first stopping piece extending from the first flange, a second stopping piece extending from the second flange, a latch portion located on the first flange, a first protrusion located on the second flange, wherein the latch portion and the first protrusion extend through the through opening by being elastically deformed, the latch portion and the first protrusion abut the front surface, and the first stopping piece and the second stopping piece abut the back surface; and the first protrusion substantially semicircular.

2. The enclosure of claim 1, wherein the latch portion comprises a guiding portion connected to the first flange, the guiding portion is contained in a first plane, and a first acute angle is defined between the first plane and the first flange.

3. The enclosure of claim 2, wherein the latch portion further comprises a resisting portion extending from the first flange, the resisting portion is contained in a second plane, and the second plane is substantially perpendicular to the first flange.

4. The enclosure of claim 3, wherein a second acute angle is defined between the second plane and the first plane.

5. The enclosure of claim 1, wherein the blocking board comprises additional one of the first flange, and two first flanges are substantially perpendicular to each other.

6. The enclosure of claim 5, wherein a plurality of second protrusions are located on the two first flanges, and each of the plurality of second protrusions is semicircle shaped.

7. The enclosure of claim 6, wherein additional one of the latch portion is located on the additional one of the first flange, a corner is defined between the two first flanges, and the latch portion of each of the two first flanges is near to the corner.

8. The enclosure of claim 1, wherein the blocking board comprises additional one of the second flanges, and two second flanges are substantially perpendicular to each other.

9. The enclosure of claim 8, wherein a plurality of the first protrusions are located on each of the two second flanges, a first line is defined by connecting the plurality of first protrusions on one of the two second flanges, a second line is defined by connecting the plurality of first protrusions on another one of the two second flanges, and the first line and the second line are in the same plane.

10. An enclosure comprising:
a rear panel, the rear panel comprising a front surface and a back surface opposite to the front surface, a through opening defined in the rear panel; and
a blocking board, the blocking board comprising a main body, two first flanges and two second flanges, a first stopping piece extending from each of the two first flanges, a second stopping piece extending from each of the two second flanges, a latch portion and a second protrusion located on each of the two first flanges, a first protrusion located on each of the two second flanges, wherein the second protrusion and the first protrusion extend through the through opening by being elastically deformed; the latch portion, the second protrusion and the first protrusion abut the front surface; and the first stopping piece and the second stopping piece abut the back surface; and the second protrusion and the first protrusion having a same configuration, and each of the second protrusion and the first protrusion being substantially semicircular.

11. The enclosure of claim 10, wherein the latch portion comprises a guiding portion connected to the corresponding one of the two first flanges, the guiding portion is contained in a first plane, and a first acute angle is defined between the first plane and the corresponding first flange.

12. The enclosure of claim 11, wherein the latch portion further comprises a resisting portion extending from corresponding the one of the two first flanges, the resisting portion is contained in a second plane, and a second plane is containing the resisting portion, and the second plane is substantially perpendicular to the corresponding first flange.

13. The enclosure of claim 12, wherein a second acute angle is defined between the second plane and the corresponding first plane.

14. The enclosure of claim 10, wherein the two first flanges are perpendicular to each other.

15. The enclosure of claim 10, wherein the two second flanges are perpendicular to each other.

16. The enclosure of claim 15, wherein a plurality of the first protrusions are located on each of the two second flanges, a first line is defined by connecting the plurality of first protrusions on one of the two second flanges, a second line is defined by connecting the plurality of first protrusions on another one of the two second flanges, the first line and the second line are in the same plane.

17. An enclosure comprising:
a rear panel, the rear panel comprising a front surface and a back surface opposite to the front surface, a through opening defined in the rear panel; and
a blocking board, the blocking board comprising a main body, two first flanges and two second flanges, a first stopping piece extending from each of the two first flanges, a second stopping piece extending from each of the two second flanges, a latch portion and a second protrusion located on each of the two first flanges, and a first protrusion located on each of the two second flanges, wherein the second protrusion and the first protrusion extend through the through opening by being elastically deformed; the latch portion, the second protrusion and the first protrusion abut the front surface; and the first stopping piece and the second stopping piece abut the back surface, and the two first flanges are perpendicular to each other.

18. The enclosure of claim 17, wherein the latch portion comprises a guiding portion connected to the corresponding one of the two first flanges, the guiding portion is contained in a first plane, and a first acute angle is defined between the first plane and the corresponding first flange.

19. The enclosure of claim 17, wherein the two second flanges are perpendicular to each other.

20. The enclosure of claim 19, wherein a plurality of the first protrusions are located on each of the two second flanges, a first line is defined by connecting the plurality of first protrusions on one of the two second flanges, a second line is defined by connecting the plurality of first protrusions on another one of the two second flanges, the first line and the second line are in the same plane.

* * * * *